United States Patent [19]

Germerdonk et al.

[11] 4,056,606
[45] Nov. 1, 1977

[54] DESULFURIZATION OF WASTE GASES CONTAINING HYDROGEN SULFIDE

[75] Inventors: Rolf Germerdonk, Schildgen; Adam Jonas, Leichlingen; Dieter Hüllstrung; Bernhard Scherhag, both of Leverkusen, all of Germany

[73] Assignee: Bayer Aktiengesellschaft, Leverkusen, Germany

[21] Appl. No.: 689,876

[22] Filed: May 25, 1976

[30] Foreign Application Priority Data

| May 30, 1975 | Germany | 2524124 |
| Apr. 21, 1976 | Germany | 2617311 |

[51] Int. Cl.² .............................................. C01B 17/04
[52] U.S. Cl. .................................... 423/575; 423/222
[58] Field of Search ................ 423/222, 226, 575, 243

[56] References Cited

U.S. PATENT DOCUMENTS

| 2,729,543 | 1/1956 | Keller | 423/575 |
| 2,881,047 | 4/1959 | Townsend | 423/575 |
| 3,796,796 | 3/1974 | Deschamps et al. | 423/575 |
| 3,933,994 | 1/1976 | Rounds | 423/575 |
| 3,953,586 | 4/1976 | Tanimura | 423/575 |

FOREIGN PATENT DOCUMENTS

| 870,510 | 3/1942 | France | 423/575 |

*Primary Examiner*—G. O. Peters
*Attorney, Agent, or Firm*—Burgess, Dinklage & Sprung

[57] ABSTRACT

Hydrogen sulfide in a gas is converted to sulfur by treatment with sulfur dioxide in the presence of a buffered organic polybasic acid with conversion of excess sulfur compounds in the gas to sulfur dioxide for recycle to the conversion.

10 Claims, 5 Drawing Figures

DESULFURIZATION OF WASTE GASES CONTAINING HYDROGEN SULFIDE

This invention relates to a process for purifying gases containing hydrogen sulfide and, optionally, also sulfur dioxide and/or organic compounds. A surplus of hydrogen sulfide is reacted in the presence of $SO_2$ to form a solid sulfur in a buffered aqueous solution containing a polybasic organic acid in accordance with the following idealized reaction scheme:

$$2H_2S + SO_2 \rightarrow 3S + 2H_2O$$

while the organic compounds, if any, are thermally decomposed into carbon dioxide, water and, possibly, $SO_2$ in that quantity (of hydrogen sulfide) which, according to the above general equation, is required for converting the hydrogen sulfide with sulfur dioxide into sulfur. Depending upon the origin of the gases the organic compounds may themselves contain sulfur, in which case the thermally decomposed gas is left having a sulfur dioxide content commensurate with the sulfur content of these compounds.

Various processes have been proposed for working-up gases containing hydrogen sulfide, including for example absorption in alkaline washing agents, in which case the hydrogen sulfide is converted into sulfide or hydrogen sulfide salts adsorption on active carbon, optionally under oxidizing conditions, thermal oxidation of the waste gases, followed by removal of the sulfur dioxide, in organic absorption solvents, the so-called "Claus process", also absorption in a weakly alkaline aqueous solution and oxidation of the hydrogen sulfide with atmospheric oxygen in the pressure of catalysts, such as anthraquinone disulfonic acid and sodium vanadate in the Stretford process. (Compare Ullmann, chapter: $H_2S$)

Since an ever-increasing amount of waste gases having, in some cases, considerable sulfur contents, have to be desulfurized, it is becoming increasingly more difficult economically to use processes of the type in which sulfur-containing chemicals, such as sodium hydrogen sulfide, sodium sulfite, sodium sulfate, etc., are formed. These sulfur-containing chemicals, which are inevitably formed, cannot be recycled into the economic process, at least in the long term. On the other hand, these chemicals cannot be safely dumped without further chemical reactions. Accordingly, it is of advantage to use processes of the type in which the sulfur accumulates in elemental form, because on the one hand sulfur is commercially used in large quantities and, on the other hand, may be stored before use as an inert material without too much outlay. Accordingly, the Claus process has acquired considerable practical significance for gases having a relatively high hydrogen sulfide content. In the Claus process, a component stream of the gas containing hydrogen sulfide is thermally treated to produce $SO_2$ in order catalytically to react the residual $H_2S$ in the waste gas with the sulfur dioxide obtained in this way to form sulfur. Since 1 mole of sulfur dioxide is required for reacting 2 moles of hydrogen sulfide, the stringent requirements which control of the quantitative ratios has to satisfy in the Claus process are a disadvantage. When the waste gas fluctuates considerably in regard to the quantity and concentration of hydrogen sulfide, oxygen and organic pollutants, if any, gas buffering has to be carried out at considerble expense. In general, the end gases also have to be after-treated in the interest of safety.

Although the Stretford process referred to above, in which sulfur also accumulates, is easier to handle in this respect, it is nevertheless attended by the disadvantage that the absorption chemicals used show poor solubility in water, in addition to which the reaction velocity is relatively low. Thus, a maximum of only about 0.5 g of hydrogen sulfide may be absorbed per liter of washing solution per circuit. Accordingly, extremely large, specific quantities of washing agent, which are virtually impossible to handle on a commercial scale, are required for relatively high concentrations of sulfur dioxide, amounting in the case of concentrated gases to as much as 760 liters of solution per cubic meter of waste gas. In cases where the waste gas accumulates in batches or in cases where the concentration of waste gas is subject to fluctuation, the quantities of solution required for the maximum have to be constantly pump-recirculated on account of the reaction time of at least 20 minutes.

U.S. Pat. No. 2,563,437 describes a process in which $SO_2$ produced from $H_2S$ having a concentration of about 5%, by weight, and preferably from 1 to 2%, by weight, is initially absorbed in an aqueous solution containing small quantities of aluminum sulfate and sulfuric acid. This solution is subsequently reacted with $H_2S$ in a second stage from which the sulfur is said to accumulate in filtrable form.

U.S. Pat. No. 2,729,543 describes a further development of this process, in which an aqueous solution containing an organic acid, such as citric acid, lactic acid, maleic acid, tartaric acid, oxalic acid, glutaric acid and the like, buffered to a pH of from 4 to 6 used as the absorption solution. In this known process, thiosulfate and alkali are additionally added to the absorption solution in order to accelerate the reaction velocity between $H_2S$ and $SO_2$ in the second stage. For the same reason, oxidation of the hydrogen sulfide is carried out at temperature of from 40° C to the boiling point of the reaction solution. According to this U.S. Patent, the sulfur dioxide initially reacts very quickly with a deficit of hydrogen sulfide at pH values of from 4 to 6 to form thiosulfuric acid in accordance with the equation: $2H_2S + 4SO_2 + H_2O \rightarrow 3H_2S_2O_3$. The reaction which results in the formation of sulfur in accordance with the general equation: $H_2S_2O_3 + 2H_2S = 4S + 3H_2O$, takes place much more slowly and, according to U.S. Pat. No. 2,729,543, the velocity of this reaction may be criticallly influenced both by the concentration of thiosulfuric acid and by the reaction temperature. Accordingly, an improvement in the known process for reacting $H_2S$ with $SO_2$ in buffered organic solutions containing polybasic acids is obtained by adjusting a thiosulfate concentration of up to from about 3 to 3.5 mole/l in the absorption solution, while in the second stage (regeneration of the $SO_2$-containing absorption solution) the reaction with $H_2S$ takes place at elevated temperatures, the hydrogen sulfide being added in at most the stoichiometrically necessary quantity, based on $SO_2$. According to this literature reference, an excess of $H_2S$ should be strictly avoided in order to prevent the formation of sulfur in the solution recycled to the absorption stage following separation of the sulfur.

These known processes were essentially developed for the purification of waste gases containing $SO_2$. Thus, ratios, by volume, of gas: liquid of from about 100:1 to 5000:1 may be used during the absorption of SO$_2$. With a ratio, by volume, of gas: liquid of 1700:1 for example, a 0.5 molar aqueous solution of sodium sulfosuccinate having a pH-value of about 4.5 reduced the SO$_2$ content of the waste gas from 0.25%, by volume, to 0.05%, by volume. Conversely, this process may, of course, also be used for removing hydrogen sulfide from waste gases. In this case, however, the so-called "regeneration" of the SO$_2$-containing solution requires relatively long contact times with the hydrogen sulfide (up to 15 minutes).

According to U.S. Pat. No. 3,757,488, it is said to be possible selectively to absorb the sulfur dioxide from waste gases containing both hydrogen sulfide and sulfur dioxide by treating the waste gases with an aqueous solution which has been adjusted to a pH value of from 4 to 6 and which in addition contains polybasic organic acids, such as citric acid, maleic acid, lactic acid, etc., in a concentration of from about 5 to 95%.

At a pH value of 5.7, for example, complete absorption of SO$_2$, but no absorption of H$_2$S, was observed, whereas the absorption of H$_2$S increased on approaching the neutral point.

Hydrocarbon Processing 53 (1974), No. 4 pages 75 to 77, describes a process for purifying waste gases from Claus installations, in which the waste gases are first thermally decomposed in order to convert all the sulfur compounds present in the waste gas into SO$_2$. This gas is then washed with an aqueous sodium citrate/citric acid solution and the washing solution is subsequently regenerated with hydrogen sulfide, resulting in the precipitation of elemental sulfur which is filtered off from the recirculated solution.

German Offenlegungsschrift No. 2,432,749 relates essentially to a process for regenerating absorption solutions containing sulfur dioxide with hydrogen sulfide, aqueous solutions of sodium phosphate, sodium citrate or mixtures thereof having pH values of from about 3 to 4 preferably being used as absorbent. The main object of this known process is continuously and quickly to react the aqueous absorbent containing sulfur dioxide with gaseous hydrogen sulfide and to reduce the deposition of sulfur in the reaction zone itself to a minimum. By turbulent mixing of gas and liquid, regeneration of the absorption liquid is obtained in a contact time of 4 seconds, although, in order to compensate for fluctuations in the concentration of H$_2$S, residence times in the regeneration zone of from 10 to 300 seconds are proposed. In order to obtain complete regeneration of the absorption liquid, stoichiometric excesses of hydrogen sulfide, more especially in the range of from 5 to 50%, based on sulfur dioxide, are introduced into the regenerator.

It has now been found that the processes described above may be considerably simplified, even in cases where the purity of the residual gas has to meet stringent requirements, and effectively controlled, even in cases where the waste gases accumulate in batches having different concentrations of hydrogen sulfide. In the process according to the present invention, aqueous solutions, buffered with inorganic bases, for example sodium hydroxide or potassium hydroxide, to pH values of from 2 to 6, of organic polybasic acids, such as oxalic acid, malonic acid, glutaric acid, adipic acid, maleic acid, fumaric acid, citraconic acid, phthalic acid or mixtures thereof, hydrogen sulfide and sulfur dioxide are simultaneously introduced in finely divided form, sulfur being precipitated in elemental form. In one advantageous embodiment of the process the sulfur dioxide is produced by burning some of the hydrogen sulfide and is introduced together with the hydrogen sulfide into a first absorber. The reactio of sulfur dioxide and hydrogen sulfide takes place in this first absorption zone, preferably under substantially stoichiometric conditions, but on a time average with a minimum excess of H$_2$S in the issuing gas of about 0.05 to 2%, by volume, preferably about 0.5%. The excess of the smoke gas containing sulfur dioxide, formed by subsequent combustion of the hydrogen sulfur content with added air, is directly delivered from the combustion zone to a second absorber into which the washing solution from the first absorber is introduced following separation of the sulfur precipitated. This washing solution is then recycled to the first absorber. The gas issuing from the first absorber, which still contains more than about 0.05%, by volume, of hydrogen sulfide, is best introduced into a combustion chamber together with the component stream branched off for the direct production of sulfur dioxide, so that all the waste gas passes through the combustion chamber at least once and hence all the organic pollutants are decomposed, whereas the end gas, after passing through the second absorber, only contains carbon dioxide, water and traces of sulfur dioxide. In one particularly advantageous embodiment of the process the precipitated sulfur is used for the production of the SO$_2$ amount needed for the reaction after an appropriate purification or melting out, which means, that no circuit of SO$_2$ gases is necessarily needed.

Instead of the usage of the sulfur precipitated only the sulfur can also be easily mixed up with another amount of sulfur not precipitated in the process. If it is not desirable to apply the sulfur precipitated or a mixture, other sulfur containing materials can be applied as well. This is advantageous in all those cases where great amounts of sulfur or materials with a high sulfur content are available. For example the "sulfur resins" produced in the process for vulcanization auxiliary means which contain about 40 – 50% by weight of sulfur can be applied well. The sulfur dioxide produced by burning some of the precipitated sulfur or the mixture or other sulfur or materials with a high sulfur content is introduced together with the hydrogen sulfide into a first absorber and treated as already described above.

Accordingly, the present invention relates to a process for removing hydrogen sulfide, and optionally sulfur dioxide and/or organic compounds, from gases, in which the sulfur compounds are converted into solid elemental sulfur by treating the gases with an aqueous solution buffered by the addition of a base and containing organic polybasic acids having a dissociation constant of about $10^{-2}$ to $10^{-5}$, distinguished by the fact that:

a. the gas having a molar ratio of hydrogen sulfide to sulfur dioxide of approximately, or greater than about 2 is brought into contact in finely divided form in a first absorption and reaction zone at temperatures of about 10° to 100° C with an aqueous solution of one or more of the organic polybasic acids buffered by the addition of a base to a pH value of about 2 to 6;

b. the sulfur accumulating in solid form from the solution is removed from at least a component stream of the solution;

c. the gas leaving stage (a), optionally in admixture with hitherto untreated gases and air is heated to temperatures in the range of from about 700° to 1000° C to convert the sulfur compounds present in the gases into sulfur dioxide and to oxidize any organic compounds present into carbon dioxide and water;

d. the $SO_2$-containing smoke gas from stage (c) is delivered to stage (a), optionally in the component-stream quantity necessary for adjusting the hydrogen sulfide/sulfur dioxide molar ratio required in stage(a);

e. the residual smoke gas component stream from (c) is treated in a second absorption stage (e) with the solution leaving stage (b) for the substantially quantitative absorption of $SO_2$; and f. the $SO_2$-containing solution from stage (e) is recycled to stage (a).

Preferred organic polybasic acids are aliphatic and aromatic dicarboxylic acids, especially alkane-, alkene- and benzene-dicarboxylic acids containing up to about 8 carbon atoms, e.g. oxalic acid, malonic acid, glutaric acid, adipic acid, maleic acid, fumaric acid, citraconic acid and/or phthalic acid. Not only for economic reasons, but also for technical reasons, it is preferred to use a mixture of organic polybasic acids which contains approximately from 40 to 60% of glutaric acid, from 15 to 30% of adipic acid and from about 20 to 40% of succinic acid. A mixture of this type is also technically known as "undistilled glutaric acid". It has been found that, in cases where an acid mixture of this type is used, there is no need to add any base to stabilize the pH-value, even when a test installation is run for several days, so that no secondary products are formed either.

Accordingly, neither sodium sulfate nor sodium thiosulfate have to be removed from the circuit.

Apart from the low consumption of chemicals and the use of readily obtainable organic acids, the process according to the present invention has a number of other advantages. The molar ratio of hydrogen sulfide to sulfur dioxide does not have to be constantly regulated as accurately as possible to a value of 2:1, but only on a time average, because the washing solution has a considerable buffering effect. The capacity both of the first stage and of the second stage is relatively high and it is possible to treat even large quantities of gas with relatively small contents of hydrogen sulfide and $SO_2$. For example, a waste gas having a hydrogen sulfide content of about 80%, by volume, and an $SO_2$-content of about 3%, by volume, which has been adjusted by the addition of $SO_2$-containing waste gas to an $H_2S:SO_2$ molar ratio of about 2:1 and hence to an $H_2S$-content of about 15.85%, by volume, and an $SO_2$-content of about 7.73%, by volume, may be converted substantially quantitatively into sulfur for a specific gas load in absorber (a) of at most about 150 $m^3$gas/$m^2$cross-section/hour, a ratio, by volume, of gas introduced to liquid added (i.e., pump-recirculated) of about 40 and a contact time of $\sim 5$ seconds, the sulfur floating under these flow conditions and accumulating in the form of a readily filtrable suspension in the upper part of the absorption and reaction zone. In general, the reaction solution is adjusted to a pH value of about 2 to 6, preferably about 3.3 to 3.9, by the addition of the conventional alkalis, such as sodium hydroxide, potassium hydroxide, soda or potash. The temperature of the reaction solution in the first stage is maintained at from about 30° C to the boiling point of the solution and preferably about 40° to 60° C. The ratio, by volume, of gas to absorption liquid may fluctuate within relatively wide limits, depending upon the hydrogen sulfide content of the waste gas. Since, in contrast to conventional processes, the absorption of $H_2S$ and $SO_2$ and their reaction and conversion into sulfur take place simultaneously in column (a), the necessary ratio, by volume, of gas introduced to pump-recirculated liquid is governed solely by the following conditions:

1. the concentration of sulfur obtainable in the suspension produced by flotation at the head of column (a), and
2. the residue of $SO_2$ to be absorbed in column (e).

Approximately 15 $1/m^3$ ($H_2S + SO_2$), corresponding to $\sim 100$ g of S/l of solution, are required for condition (1). Greater ratios by volume, i.e., larger specific pump-recirculated quantities, arise out of condition (2) when more than about 5% of the total $SO_2$ has to be taken up by the solution in absorber (e). In general, the ratio, by volume, of gas input to the quantity of pump-recirculated liquid in absorber (a) amounts to about 8:1 to 60:1 and preferably to about 30:1 to 40:1, the contact times of the gas generally being about 3 to 30 seconds and preferably about 4 to 6 seconds.

Under the effect of the thermal treatment of the waste gas leaving the first absorption stage, any organic compounds present in the gas to be washed out are all decomposed. Thermal decomposition is carried out in a combustion chamber, in which a temperature above about 700° C up to about 1000° C is maintained, optionally by the introduction of liquid or gaseous fuels.

By combining two absorption stages with a combustion chamber, the system is rendered highly insensitive to fluctuations in the quantity and composition of the waste gases to be purified, because any momentary excess of $SO_2$ is removed in the second absorption zone and, in addition, the excess $H_2S$ leaving the first absorption zone is converted in the combustion chamber into $SO_2$ which is delivered either to the first or to the second absorption zone. In either case, an end gas of high purity is formed, containing less than about 1 ppm of hydrogen sulfide and a maximum of about 0.1%, by volume, of sulfur dioxide.

The invention will be further described with reference to the accompanying drawing wherein.

Figure 1:
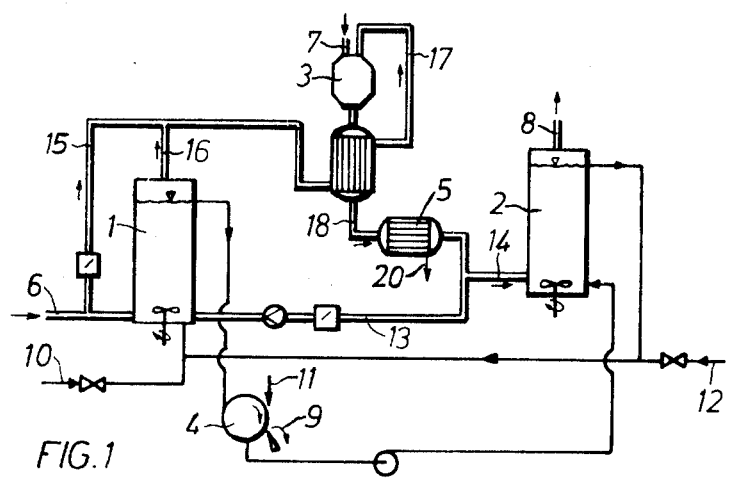
FIG. 1 is a flow sheet of a process in accordance with the invention for removing $H_2S$ from a waste gas containing only $H_2S$ and $N_2$.

The apparatus used for carrying out the processes is simple and consists essentially of two absorbers 1 and 2, a combustion chamber 3 and one or two filters 4 for separating off the sulfur. It is also possible to arrange several such units in parallel or one behind the other. The reference numerals appearing in the Figures have the following meaning:

1 = first absorber
2 = second absorber
3 = combustion chamber, optionally with a heat exchanger
4 = sulfur filter, decanter
5 = cooler (condenser)

6 = waste gas to be treated
7 = air supply
8 = purified waste gas
9 = sulfur output
10 = alkali input
11 = washing water
12 = input of fresh absorption solution
13 = cooled smoke gas — component stream to the first absorber
14 = cooled smoke gas — component stream to the second absorber
15 = component stream of the waste gas to be treated
16 = waste gas from the first absorber
17 = preheated waste gas from the first absorber
18 = smoke gas
19 = air
20 = condensate.
21 = combustion chamber for material containing sulfur
22 = waste material containing sulfur
23 = combustion air
24 = waste heat utilization (e.g. steam boiler)
25 = cooled smoke gas containing sulfur dioxide
26 = ash or slag outlet from the combustion chamber 21
27 = component stream of the sulfur obtained from hydrogen sulfide
28 = melting and decanting tank for the sulfur filtered off 9
29 = container for pure, liquid sulfur produced
30 = washing solution separated in the tank 28.

Each figure will now be described more specifically with reference to a specific example of a composition which it is designed to treat.

In the example utilizing the apparatus of FIG. 1, an incoming waste gas 6 containing on average 80% of hydrogen sulfide, balance $N_2$, is divided up in a ratio of 27.1 : 72.9. The larger component stream enters the absorber 1 in the form of a gas bubble washer with a gas dispersion stirrer. The washing liquid consists of a solution of 10 g of undistilled glutaric acid (~50% of glutaric acid, 20% of adipic acid and 30% of succinic acid) per liter of water, adjusted with sodium hydroxide to a pH-value of 3.5. Its temperature is maintained at 58° C. The gas 16 leaving the absorber 1 at its upper end, which still contains 0.576% by volume of hydrogen sulfide, is introduced with the smaller component stream of the crude waste gas 15, together with a 2.62-fold quantity of air 7, based on the quantity of $H_2S$ at 6, into the combustion chamber at 17, preheated to 450° C 3 and then reacted at 78° C to form a smoke gas containing 2.42% of sulfur dioxide, 15.55% of water vapor, 1.76% of oxygen, balance nitrogen. The smoke gas 18 is then cooled to 48° C in the cooler 5 whereby 0.565 kg of water an condensing out at 20 per $Nm^3$ of $H_2S$ introduced at 6. The smoke gas is divided up in a ratio of about 20.7: 79.3. The 79.3% are returned via 13 to the absorber 1 through a regulating flap and a fan. The other 20.7% of the smoke gas 14 is introduced into the smaller absorber 2 where it is purified 8 at 48° C, corresponding to the pH value of the solution, to a sulfur dioxide content of 0.04%, by volume. The specific gas load in both absorbers amounts to 150 $m^3/m^2$ cross-section/hour and the recirculation of liquid to 25 $1/m^3H_2S$.

The elemental sulfur formed in absorber 1 in accordance with the general reaction $$2H_2S + SO_2 \rightarrow 3S + 2H_2O$$

is floated in the absorber 1 under these process conditions and may be removed with some of the liquid in the form of a readily filtrable suspension at the head of the absorber 1. The absorption solution filtered in the rotary filter 4 is delivered to the absorber 2 for residual absorption of the sulfur dioxide. The solution then enriched with sulfur dioxide flows back into the absorber 1. The sulfur is washed 11 and removed at 9.

By selecting the ratio of the component streams (13):(14) and their temperature behind the cooler 5, the temperatures in the absorbers 1 and 2 and hence the water balance as well may be controlled in such a way that all the water formed during the raction may be removed as condensate 20 and as steam with the smoke gas at 8. Corresponding to the formation of small quantities of sodium thiosulfate or sodium sulfate, sodium hydroxide 10 is introduced into the absorber 1 to regulate pH. In the present case, however, this was not necessary even after more than 100 hours' operation. Losses of organic acids, for example with the sulfur 9 filtered off, are compensated by the regulated addition of fresh absorption solution 12.

Figure 2:
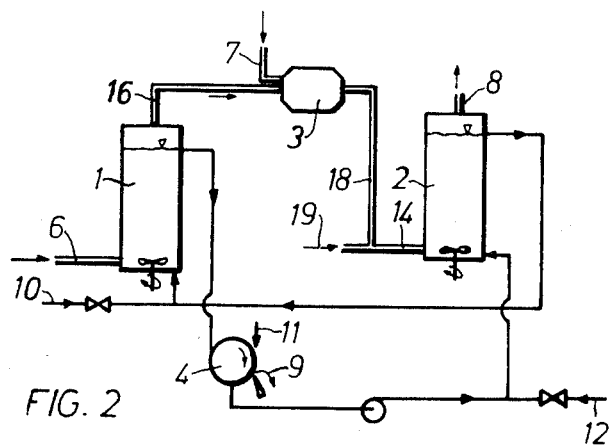
FIG. 2 is a flow sheet of a process for treating waste gas containing $H_2S$, a considerable quantity of $SO_2$ and $H_2S$-containing waste air.

In practicing the example (the embodiment) illustrated in FIG. 2, the process according to the present invention is used for the treatment of a waste gas which, in addition to hydrogen sulfide, contains a considerable quantity of sulfur dioxide, and waste air containing traces of hydrogen sulfide which is used as combustion air. The waste gas 6 containing on average 59.0% by volume of $H_2S$, 29.3% by volume of $SO_2$ and 11.7% by volume of $N_2$, is introduced at the lower end of the main absorption tower 1 where it is finely dispersed by means of a dispersion stirrer with a gas load of about 50 $m^3/m^2$ cross-section/hour and an average residence time of the gas bubbles in the absorption solution of from about 5 to 10 seconds. The composition of the absorption solution is the same as in FIG. 1. Its temperature is maintained at 60° C. In addition to 0.5% of $H_2S$, the waste gas (16) leaving the absorber 1 at its upper end contains only traces of $SO_2$. Without being preheated, it is introduced into the combustion chamber 3 together with the pollutant-containing combustion air 7 preheated to 450° C and containing 0.267% by volume of $H_2$ and natural gas as fuel. Ratio, by volume, of waste gas 6 to exhaust air 7 to natural gas = 1:0.87:0.355. The smoke gas 18 issuing from the combustion chamber with a temperature of 785° C has the following composition: 3.08%, by volume of $CO_2$, 0.294% by volume of $SO_2$, 9.1% by volume of $H_2O$, 10.5% by volume of $O_2$, balance $N_2$. It is mixed with 2.04 times the quantity of air 19, based on the waste gas 6, and is introduced at a temperature of 240° C into the column 2 where the $SO_2$ is washed out at 60° C to a residue of 0.04%, by volume, at the smoke gas outlet 8.

Liquid recirculation, sulfur filtration 4, washing 11 and removal 9 and also the addition of chemicals 10 and 12 correspond to FIG. 1.

The heat of combustion introduced into the gas in the combustion chamber is used for decomposing the hydrogen sulfide and any other organic pollutants present in the gas streams 7 and 16, and for removing the water of reaction of 0.524 $kg/m^3$ of the waste gas stream 6 by evaporation from the column 2 to the smoke gas stream 8.

Figure 3:
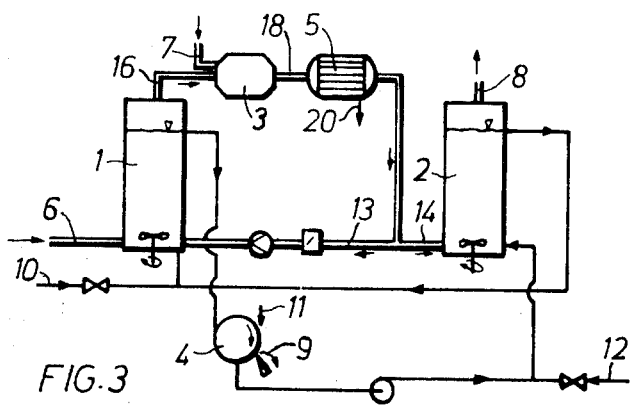
FIG. 3 is a flow sheet of a process for treating a waste gas containing $H_2S$, COS, $C_2H_5SH$ and perhaps other sulfur-containing compounds.

In the embodiment illustrated in FIG. 3, the process according to the present invention is used for the treatment of a waste gas stream 6 which, in addition to hydrogen sulfide, contains on average 6.23% by volume of carbon oxide sulfide and 6.23% by volume of ethyl mercaptan as examples of sulfur-containing pollutants. The combustion air 7 contains 0.175%, by volume, of carbon oxide sulfide and 0.175%, by volume, of ethyl mercaptan. All the waste gas 6 is introduced into the absorber 1 which is equipped with a gas dispersion stirrer. The washing solution is the same as in FIG. 1. The gas leaving the absorber 1 at 16 has the following composition at 53° C: 1.13% by volume of $H_2S$; 0.338% by volume of COS; 0.338% by volume of $C_2H_5SH$; 3.18% by volume of $CO_2$; 1.92% by volume of $O_2$; 14.12% by volume of $H_2O$, traces of $SO_2$, balance $N_2$. Because of the danger of explosion, the gas 16 is introduced without preheating into the combustion chamber 3 together with 5.93 times, based on the waste gas volume 6, of exhaust air preheated to 450° C. The smoke gas 18 leaving the combustion chamber 3 with a temperature of 780° C has the following composition: 1.405% by volume of $SO_2$; 12.58% by volume, of $H_2O$; 3.25% by volume of $CO_2$; 1.96% by volume of $O_2$, balance $N_2$. It is cooled to 48° C in the cooler 5, 0.365 kg of water/m³ of the waste gas introduced at 6 condensing out 20. The smoke gas is divided up in a ratio of 75.6:24.4. The 75.6% are returned 13 to the absorber 1 through a regulating flap and a fan. The other 24.4% of the smoke gas 14 are introduced into the smaller absorber 2 and purified at 48° C to a residual sulfur dioxide content of 0.04% by volume. In both absorbers, the specific gas load amounts to 150 m³/m² cross-section/hour and the recirculation of liquid to 75 1/m³ of the hydrogen sulfide introduced at 6.

Figure 4:
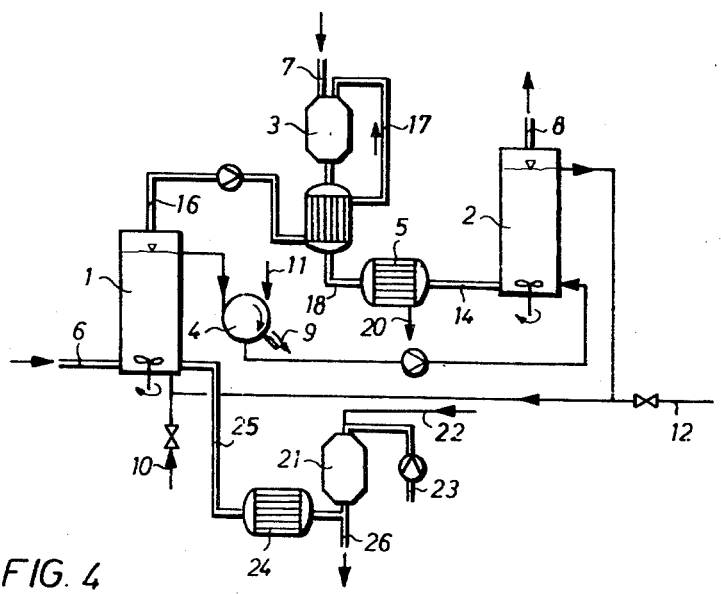
FIG. 4 is a flow sheet of a process in accordance with the invention for removing $H_2S$ from a waste gas by burning waste containing sulfur.

Separation of the sulfur 4, washing 11, removal 9 and the addition of chemicals 10 and 12 correspond to the embodiment illustrated in FIG. 1, as does removal of the water of reaction partly in the form of condensate 20 and partly in the form of vapors with the waste gas 8. In practicing the example (the embodiment) illustrated in FIG. 4, the process according to the present invention is used for the treatment of a waste gas, in which the required sulfur dioxide being derived chiefly from the combustion of waste containing sulfur. The exhaust air 6 containing an average of 80% by volume hydrogen sulfide, traces of organic pollutants, balance $N_2$ is led into the gas bubble column with dispersion stirrer 1, where it comes into contact with the gas stream 25 containing an average of 4.32% by volume $SO_2$, 10.6% by volume $CO_2$, 2.76% by volume $H_2O$, 3.52% by volume $O_2$ and 78.79% by volume $N_2$. The ratio of the standard volumes of streams 6 and 25 is 1 : 8,68. The gas stream 25 is the smoke gas from the sulfur residue burnt in the combustion chamber 21 with a 20% excess of air 23, the sulfur residue having a mean content of combustible material of 50% by weight S, 46% by weight C, 4% by weight H. The ash or slag 26 resulting from the combustion of the waste material is removed from the combustion chamber. The smoke gas is then cooled between combustion chamber 21 and absorber 1 in a waste heat boiler 24 to utilize the heat. Hydrogen sulfide and sulfur dioxide are absorbed in the absorber 1 at 45° C by the aqueous solution containing 50 g undistilled glutaric acid per liter and adjusted to a pH of 3.5, and react to form elemental sulfur and water. The sulfur is floated in the way previously described, and separated 9. The mean composition of the gas leaving the absorber 1 is as follows: 0.53% by volume $H_2S$, 9.83% by volume $CO_2$, 11.11% by volume $H_2O$, 3.31% by volume $O_2$, traces of organic pollutants, 75.22% by volume $N_2$ and its standard volume is 9.36 times that of stream 6. The gas 16 is no longer expolsive and can therefore be compressed without risk after which it is preheated to 450° C 17 using the preheater 3 and then heated to 800° C in the combustion chamber by a flame 7 of natural gas and air, with an air excess of $\lambda = 1.05$, and by mixing with 0.35 times the quantity of smoke gas. In this way the remaining hydrogen sulfide and the traces of organic substances are oxidized. The gas 18 still contains 0.39% by volume $SO_2$. After the separation of the reaction water 20 in the cooler 5, this sulfur dioxide is washed out in the absorber 2 to 0.04% by volume by the 5% dicarboxylic acid solution pumped out from the filter 4. The quantity of sulfur dioxide produced in the combustion chamber 21 is best regulated by the pH of the absorption solution in column 1. The amount of reaction water present in stream 16, which is dependent on the fluctuating proportion of water vapor in the gas stream 25, is regulated via the temperature in the absorber 1.

Figure 5:
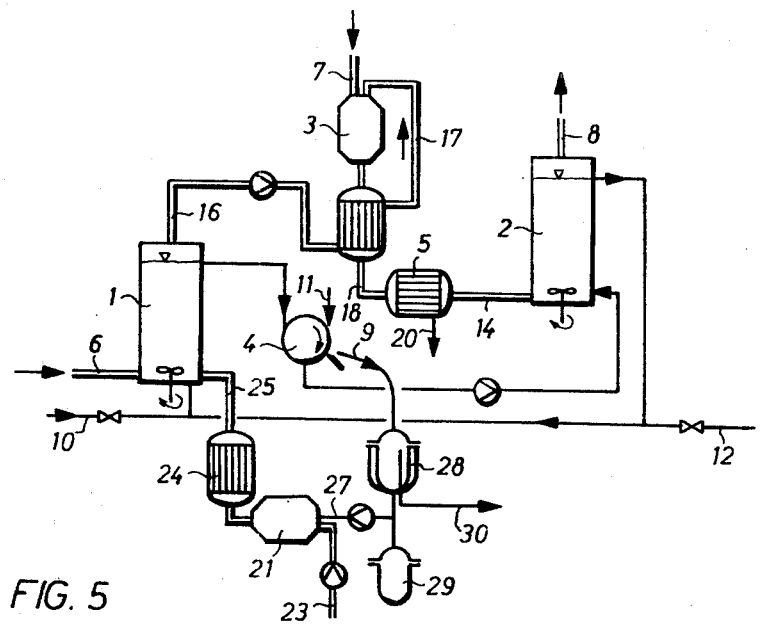
FIG. 5 is a flow sheet of a process in accordance with the invention for removing $H_2S$ from a waste gas by burning partly the sulfur produced.

In practicing the example (the embodiment) illustrated in FIG. 5, the process according to the present invention is used for the treatment of a waste gas, in which about one-third of the sulfur produced is used up. The gas 6 containing an average of 40% by volume hydrogen sulfide, traces of organic substances, balance nitrogen, is led into the absorber 1 together with the smoke gas 25 derived from the sulfur combustion 21 and containing 18.5% by volume $SO_2$, 2.5% by volume $O_2$, balance $N_2$, in the ratio 6 : 25 = 1 : 1.05 (by standard volumes). The smoke gas 25 is produced by the combustion of 47.5 mole % of the sulfur fed in with the stream 6 in the form of hydrogen sulfide, the excess of air being 13.5%. The sulfur 27 to be burnt in the combustion chamber 21 is taken as a component stream from the melting stage 28, which is connected to the filter 4. In the melting tank, the molten sulfur and the adherent washing liquid 30 are decanted at a temperature of ~125° C and 2.5 - 3 bar pressure. The excess sulfur, the quantities of which correspond to the quantity of hydrogen sulfide added to stream 6, is drawn off in liquid form and stored until required for further use 29.

The reaction of the hydrogen sulfide from stream 6 with the sulfur dioxide from stream 25 in the absorber 1 again corresponds to the previous example, as does the recycling of the excess hydrogen sulfide escaping with stream 16. The temperature in the absorber 1 is maintained at 61.5° C to permit the removal of the reaction water from the absorption solution with stream 16. Stream 16 here contains 0.54% by volume $H_2S$, 1.39% by volume $O_2$, 21.4% by volume $H_2O$, balance $N_2$, the ratio of stream 6 : 25 being 1 : 1.869 (standard volumes).

It will be appreciated that the instant specification and examples are set forth by way of illustration and not limitation, and that various modifications and changes may be made without departing from the spirit and scope of the present invention.

What is claimed is:

1. A process for removing hydrogen sulfide from a gas containing it comprising treating the gas with an aqueous solution of at least one organic polybasic acid selected from the group consisting of oxalic acid, malonic acid, glutaric acid, adipic acid, maleic acid, fumaric acid, citraconic acid and phthalic acid and buffered by a base,
   a. the gas having a molar ratio of hydrogen sulfide to sulfur dioxide of at least about 2:1 and being brought into contact in finely divided form in a first absorption and reaction zone at a temperature of about 10 to 100° C with the aqueous absorption solution buffered by the base to a pH of about 2 to 6, thereby to produce solid sulfur;

b. the sulfur accumulating in solid form from the solution being removed from at least a component stream of the solution;

c. the gas leaving stage (a) being heated to a temperature of about 700° to 1000° C, thereby converting the sulfur compounds present in the gas into sulfur dioxide and oxidizing any organic compounds present into carbon dioxide and water;

d. $SO_2$-containing smoke gas from stage (c) being recycled to stage (a);

e. the balance of the smoke gas component stream from (c) being treated in a second absorption stage (e) with the solution leaving stage (b) for the substantially quantitative absorption of $SO_2$, and f. the $SO_2$-containing solution from stage (e) being recycled to stage (a).

2. A process as claimed in claim 1, wherein the absorption solution is adjusted to a pH value of about 3.3 to 3.9.

3. A process as claimed in claim 1, wherein the absorption solution is maintained at a temperature of about 40° to 60° C.

4. A process as claimed in claim 1, wherein the ratio by volume of the quantity of gas introduced to the quantity of liquid recirculated in the absorber is from about 8:1 to 60:1.

5. A process as claimed in claim 1, wherein the residence time of the gas in the absorber amounts to about 3 to 30 seconds.

6. A process as claimed in claim 1, wherein said hydrogen sulfide-containing gas further contains at least one of $SO_2$ and an organic sulfur-containing compound.

7. A process as claimed in claim 1, wherein the organic polybasic acid comprises a mixture of about 40 to 60% of glutaric acid, about 15 to 30% of adipic acid and about 20 to 40% of succinic acid.

8. A process as claimed in claim 1, wherein the precipitated sulfur is burnt for preparing the $SO_2$ amount needed.

9. A process as claimed in claim 1, wherein material of a high sulfur content is burnt.

10. A process as claimed in claim 7, wherein the absorption solution is adjusted to a pH value of about 3.3 to 3.9 and its temperature is about 40° to 60° C, the ratio by volume of the quantity of gas introduced to the quantity of liquid recirculated in the absorber is from about 30:1 to 40:1 and the residence time of the gas in the absorber amounts to about 4 to 6 seconds.

* * * * *